(No Model.)
W. H. H. WHITING.
APPARATUS FOR WASHING PHOTOGRAPHIC NEGATIVES.
No. 335,002. Patented Jan. 26, 1886.
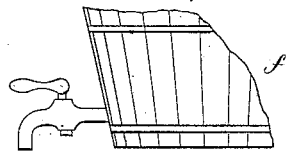
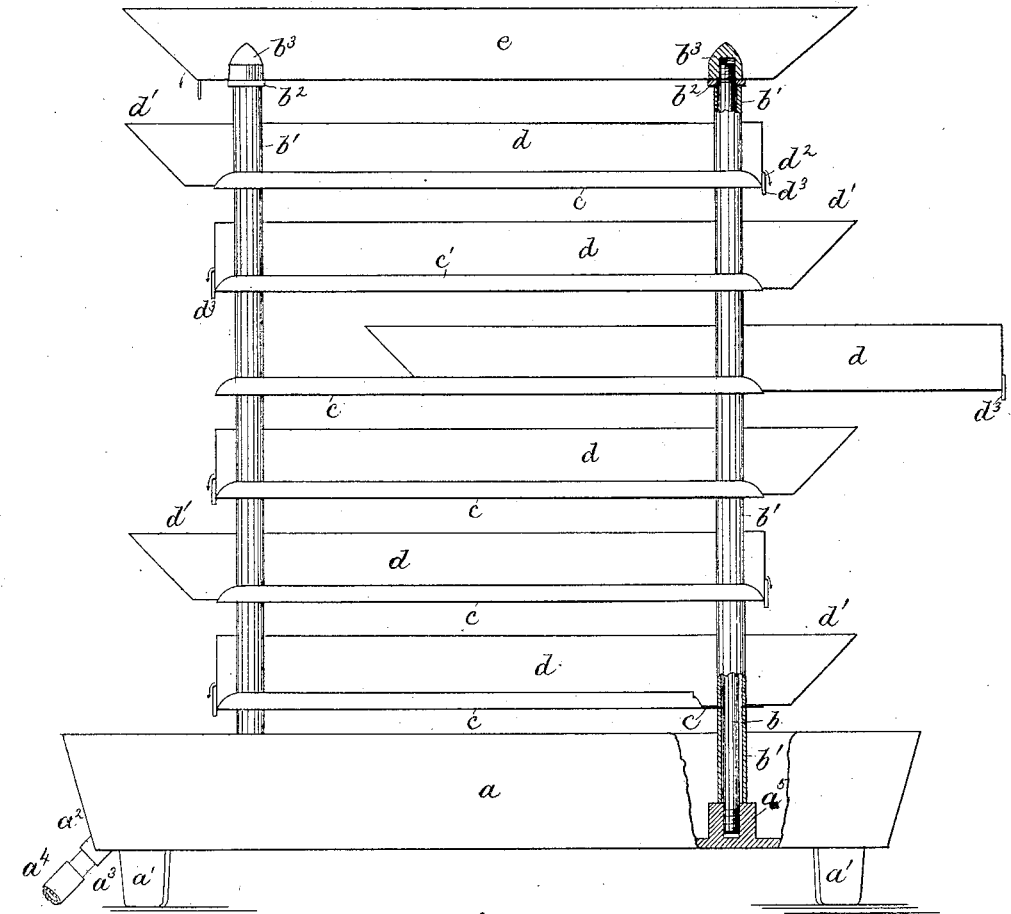
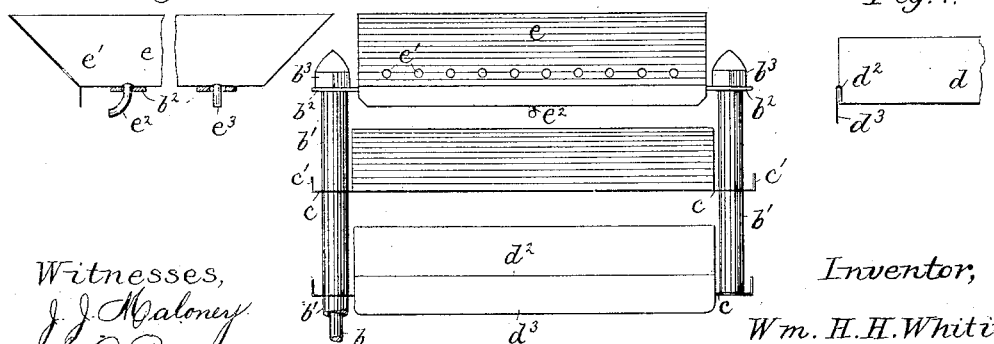
Witnesses
J. J. Maloney
H. P. Bates
Inventor,
Wm. H. H. Whiting,
by Jos. P. Livermore
Att'y.

UNITED STATES PATENT OFFICE.

WILLIAM H. H. WHITING, OF CHELSEA, MASSACHUSETTS.

APPARATUS FOR WASHING PHOTOGRAPHIC NEGATIVES.

SPECIFICATION forming part of Letters Patent No. 335,002, dated January 26, 1886.

Application filed June 8, 1885. Serial No. 168,032. (No model.)

*To all whom it may concern:*

Be it known that I, WILLIAM H. H. WHITING, of Chelsea, Suffolk county, State of Massachusetts, have invented an Improvement in Apparatus for Washing Photograph-Negatives, of which the following description, in connection with the accompanying drawings, is a specification, like letters on the drawings representing like parts.

My invention is embodied in an apparatus for washing photograph-negatives, or for other similar purposes, and has for its object to produce an apparatus by which a large number of negatives may be washed simultaneously and uniformly, the said apparatus being made in separable parts, so that it can be packed in very small space for shipment.

The apparatus consists, essentially, of a supporting-frame and a series of pans or receptacles supported thereon, the said pans being intended to receive the negatives, and being so arranged that a stream of water supplied to the upper one will flow through all the pans below, passing from end to end of each pan, and thus exposing the negatives lying on the bottom thereof to the action of a uniform gently-flowing stream of water, the negatives being at all times wholly submerged. Any one of the pans may be withdrawn at any time during the washing operation for the purpose of inspecting the negatives contained in it without interrupting the flow of water through the other pans. The base of the frame-work which supports the pans is preferably made itself as a pan or receptacle provided with a waste-passage, through which the water that has been used to wash the negatives may be discharged at any desired point.

The apparatus is specially valuable in places where there is no supply of water under pressure, as the water for washing the negatives may be taken from a pail or other suitable receptacle, which may be placed just above the apparatus, so as to deliver its contents into the uppermost pan.

The invention further consists in various details of construction of the pans and their supporting frame-work, which will be hereinafter pointed out.

Figure 1 is a side elevation, partly in section, of an apparatus for washing photograph-negatives embodying this invention, one of the pans being shown as partially withdrawn; Fig. 2, a partial end elevation showing the three uppermost pans; Fig. 3, a longitudinal sectional detail of the uppermost pan and its support, and Fig. 4 a sectional detail of the water-delivering end of one of the lower pans.

The apparatus is supported on a base, $a$, preferably of cast-iron, shaped to form a pan or shallow receptacle, and shown as provided with feet $a'$, by which it is sustained a short distance above the surface on which it rests, which may be a shelf or table or any other convenient object. This pan is provided with a boss, $a^2$, to receive the discharge-pipe $a^3$, which may be provided with a flexible tube, $a^4$, so as to easily convey the water that has been used upon the negatives to any desired point. The base or pan $a$ is also provided with a number of lugs or projections, $a^5$, extending upward from its bottom, as shown in section in Fig. 1, and provided with threaded sockets to receive the ends of threaded rods or uprights $b$, which may be of any desired length, according to the number of negative-pans the apparatus is to contain. The rods or uprights $b$ are provided with a number of tubular shelves or ferrules, $b'$, which receive between their ends a series of shelves, $c$, which are to form the supports for the negative-pans $d$, the said shelves being preferably provided with lateral flanges $c'$, to prevent overflow of water at the sides. Above the uppermost sleeves $b'$ the pairs of uprights at the ends of the frame are connected by cross-bars $b^2$, as best shown in Fig. 2, the said cross-bars, together with the entire series of sleeves and shelves below them, being securely held or clamped upon the rods $b$ by suitable nuts, $b^3$. The shelves are each provided with a series of holes which just fit over the rods $b$, and in putting the frame together, after the rods are secured in the lugs $a^5$, a sleeve $b'$ is dropped over each rod, coming to a bearing on the lugs, and then a shelf is slipped down over the rods, which pass through the holes in the shelf until it comes to a bearing on the said sleeves, after which another sleeve is placed on each rod, and then another shelf, and so on until the tops of the rods are reached. The cross-bars $b^2$ are preferably used to support a pan, $e$, which will first receive the water to be used for washing the negatives, which water may be supplied from a pail or other receptacle—such as shown at $f$, Fig. 1—when there is no convenient supply of water under pressure, and the uppermost pan will preferably not contain any negatives, as they might be injured by a too rapid delivery of water upon them. The water-receiving pan $e$ is provided at one end with a series of openings, $e'$, (see Fig. 2,) through which the water is discharged in a series of small streams and falls upon the projecting inclined end $d'$ of the negative-pan below. The end of the uppermost pan thus serves as a strainer to prevent chips or other foreign material from being carried with the water onto the negatives. Each of the negative-pans $d$ is provided at one end with an inclined water-receiving portion, $d'$, upon which the water falls from the next pan above, and the said pans are provided at their opposite ends with a lip or flange, $d^2$, (best shown in Fig. 4,) extending up above the bottom of the pan a distance somewhat greater than the thickness of a negative, so that the water delivered on the inclined portion of the other end of the pan will rise to the height of the lip or flange $d^2$, thus wholly submerging the negatives lying on the bottom of the pan, and as soon as it rises above the said lip or flange it will flow over the same and strike upon the inclined portion $d'$ of the next pan below, the pans being arranged with their inclined water-receiving portions and the water-delivering lips or flanges alternately at opposite ends of the apparatus, as shown in Fig. 1, where the direction of flow of the water is indicated by arrows. The pans are preferably provided at their delivery ends with a downwardly-extended lip or flange, $d^3$, which serves as a guide for the falling water, and also as a stop to engage the end of the shelf $c$ when the pan has been slid along the said shelf to the proper position.

When desired, any one of the pans may be slipped out along its shelf from between the ones above and below, as shown in Fig. 1, for the purpose of inspecting the negatives, or for removing the same without stopping the flow of water through the others, as the water will continue to fall from the one above the one thus removed into the second one below, and it will remain in the pan that is removed and in the one immediately below, standing at sufficient depth to cover the negatives therein. The pans will be of sufficient size to receive the largest negative that is to be washed, and two or more smaller negatives may be placed in each pan, if desired, without danger of injuring one another. The uppermost pan, $e$, is shown as provided with downwardly-projecting studs $e^2 e^3$, which may extend through openings in the cross-bars $b^2$, the stud $e^2$ at one end being preferably curved, as shown in Fig. 3, and inserted in the opening while the pan is in an inclined position, the straight stud $e^3$ entering a socket in the other cross-bar when the pan is brought to the horizontal position, and the two studs preventing displacement of the pan $e$ upon the frame-work.

When desired to pack the apparatus for shipment, the pans are removed from the frame-work consisting of the shelves and uprights and the nuts $b^3$ unscrewed, after which the cross-bars $b^2$ and the sleeves $b'$ and shelves $c$ may be removed, and the rods $b$ then unscrewed from the base $a$. The pans and shelves will then nest within one another, and the whole apparatus will be contained within a bulk scarcely greater than that of the base in which the pans, shelves, and other parts may be packed.

The rods $b$ may be of different length, and a greater or less number of pans supplied for each apparatus, according to the wishes of the purchaser.

When the apparatus is in operation, the water will be delivered in a thin sheet from the end of one negative-pan into the end of the next pan below, and will flow with uniform velocity over the surface of the negatives in all the pans, so that the negatives may be washed uniformly and thoroughly in a very short time, and with but little expenditure of water when it is difficult to obtain it in large quantities.

It is obvious that the construction of the apparatus may vary in several of the minute details, and that certain of the minor features of construction might be omitted without materially impairing the value of the rest, and the invention is consequently not limited to the precise construction shown.

I claim—

1. The combination of a supporting-frame, comprising uprights and shelves fastened thereto, with a series of pans supported on the said shelves, each pan being provided at one end with a delivering-lip of a height greater than the thickness of the article to be washed, and projecting at the other end beyond the delivering end of the next pan above, substantially as described.

2. The combination of a supporting-frame, comprising uprights and shelves fastened thereto, with a series of pans supported on the said shelves, each pan being provided at one end with a delivering-lip of a height greater than the thickness of the article to be washed, and projecting at the other end beyond the delivering end of the next pan above, and each pan also having a stop which engages the corresponding shelf when the pan is in proper working position with relation thereto, substantially as described.

3. The combination, with the base and rods or uprights detachably connected therewith, of the sleeves and shelves, constituting, with the said uprights, a pan-supporting frame, and the pans co-operating therewith, the whole forming a separable negative-washing apparatus, substantially as described.

4. The base and rods or uprights detachably connected therewith, combined with the sleeves and shelves to be supported on said uprights, and the cross-bars and nuts by which all are clamped together, and the pan provided with projections to engage the said cross-bars, and with a series of delivering-openings at one end, and the series of pans supported on the shelves below, substantially as described.

5. The pan-shaped base provided with a discharge-passage, combined with the frame supported thereon, consisting of uprights and sleeves, and the series of pans supported on the said shelves, substantially as described.

In testimony whereof I have signed my name to this specification in the presence of two subscribing witnesses.

WILLIAM H. H. WHITING.

Witnesses:
JOS. P. LIVERMORE,
H. P. BATES.